United States Patent Office 3,541,167
Patented Nov. 17, 1970

3,541,167
SELECTIVE HALOGENATION OF 2,3-DIHALOPROPENES
Reginald F. Roberts, Jr., Baton Rouge, La., assignor to The Dow Chemical Company, Midland, Mich., a corporation of Delaware
No Drawing. Filed Mar. 22, 1968, Ser. No. 715,181
Int. Cl. C07c 21/02
U.S. Cl. 260—654      3 Claims

ABSTRACT OF THE DISCLOSURE

A process for the selective halogenation of 2,3-dihalopropenes of the formula

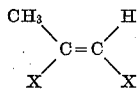

wherein in each X is F, Cl, Br or I, said process producing only the 1,2,3-tri-halopropenes, which comprises reacting by contacting the above propenes with a tertiary-butyl hypohalite of the formula

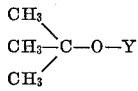

wherein Y is F, Cl, Br or I, in the presence or absence of a free-radical source.

BACKGROUND OF THE INVENTION

The use of tertiary-butyl hypochlorite as a reagent for the free-radical chlorination of hydrocarbons is well established. The literature fails, however, to emphasize the extreme selectivity of this agent with 2,3-dihalopropenes. This ester is of such a high order of selectivity as compared to molecular halogens, that it in fact produces only one trihalogenated product.

SUMMARY OF THE INVENTION

This invention is a novel process for the selective halogenation of 2,3-dihalopropenes, said process comprising reacting the propene with a tertiary-butyl hypohalite in the presence or absence of a free-radical source.

The use of tertiary-butyl hypohalites to selectively halogenate 2,3-dihalopropenes has the distinct advantage of producing only one trihalogenated derivative.

More particularly, this invention relates to a process for producing a single trihalogenated derivative of 2,3-dihalopropenes of the formula

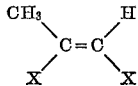

wherein each X is F, Cl, Br or I, said process comprising reacting by contacting the above propene with a tertiary-butyl hypohalite of the formula

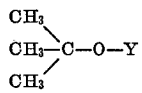

wherein Y is F, Cl, Br or I.

The mole ratio of hypohalite/propene should generally be from about 1/100 to 1/1, and preferably from about 5/100 to 10/100. While reaction temperature is not critical, −80° to 40° C. is preferred. Pressure is also not critical, and atmospheric or the autogenous pressure is preferred.

It has been found that the yields of the instant process are not affected by the presence or absence of a free-radical source; it affects only the reaction rate. A change in temperature would have a similar effect.

If it be desired to use a free-radical source, any standard one will serve; e.g., photochemical (visible or near-ultraviolet radiation), or chemical (free-radical initiators such as azobisisobutyronitrile or benzoyl peroxide).

SPECIFIC EMBODIMENTS

Example No. 1

Seven milliliters (ml.) of 2,3-dichloropropene was pipetted into a 10-ml. nitrogen swept flask, equipped with a standard-taper ground-glass stopper. Under nitrogen flow, 1 ml. of tert-butyl hypochlorite was pipetted into and thoroughly mixed with the substrate. The flask was stoppered under nitrogen flow, and illuminated for a period of 50 minutes with a 100-watt electric-light bulb, situated at a distance approximately one inch from the top of the flask, and equipped with a shield of aluminum foil to contain approximately 90% of the incident radiation. During this period of time, the temperature of the reaction mixture rose to approximately 35° C. from the heat radiated by the light bulb. A sample was withdrawn under nitrogen flow and analyzed by gas-phase chromatography. It was found to contain 88% 2,3-dichloropropene and 8.0% 1,2,3-trichloropropene, by weight.

The reaction mixture was then exposed to direct sunlight for a period of 34 minutes, at which time a second sample was found to contain 90% of the 2,3- and 8.4% of 1,2,3-trichloropropene (by weight), indicating no further reaction. A 5-ml. portion of this mixture was next mixed (under nitrogen) with approximately 2 mls. of tert-butyl hypochlorite (second increment), and illuminated with a 100-watt bulb for about two hours. A sample of this final reaction mixture was found by analysis to contain 16.0% 1,2,3-trichloropropene.

I claim:
1. A process for the selective halogenation of 2,3-dihalopropenes of the formula

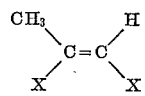

wherein each X is F, Cl, Br or I, said process comprising reacting by contacting 1 to 100 moles of the above propene with 1 mole of a tertiary-butyl hypohalite of the formula

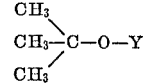

wherein Y is F, Cl, Br or I to produce the corresponding 1,2,3-trihalopropene.

2. The process of claim 1 wherein the propene is 2,3-dichloropropene.

3. The process of claim 1 wherein the mole ratio of the tertiary-butyl hypohalite/propene is from 5/100 to 10/100.

References Cited

UNITED STATES PATENTS 2,179,787   11/1939   Harford.
3,285,978   11/1966   Oga et al. _____ 260—654

BERNARD HELFIN, Primary Examiner

J. A. BOSKA, Assistant Examiner